US009541105B2

(12) United States Patent
Tanaka

(10) Patent No.: US 9,541,105 B2
(45) Date of Patent: Jan. 10, 2017

(54) SEPARATION REMOVAL AND CIRCULATION SYSTEM OF AIR BUBBLES IN FLUID

(71) Applicant: TNK CORPORATION LTD., Tokyo (JP)

(72) Inventor: Nobuyuki Tanaka, Tokyo (JP)

(73) Assignee: TNK CORPORATION LTD., Tokyo (JP)

( * ) Notice: Subject to any disclaimer, the term of this patent is extended or adjusted under 35 U.S.C. 154(b) by 74 days.

(21) Appl. No.: 14/117,082

(22) PCT Filed: Oct. 5, 2013

(86) PCT No.: PCT/JP2013/063121
§ 371 (c)(1),
(2) Date: Nov. 12, 2013

(87) PCT Pub. No.: WO2014/069024
PCT Pub. Date: May 8, 2014

(65) Prior Publication Data
US 2015/0226241 A1    Aug. 13, 2015

(30) Foreign Application Priority Data

Oct. 29, 2012 (JP) .................................. 2012-237713
Dec. 25, 2012 (JP) .................................. 2012-280718

(51) Int. Cl.
*B01D 19/00* (2006.01)
*F15B 21/04* (2006.01)
*F15B 1/26* (2006.01)

(52) U.S. Cl.
CPC ......... *F15B 21/044* (2013.01); *B01D 19/0036* (2013.01); *B01D 19/0042* (2013.01);
(Continued)

(58) Field of Classification Search
CPC ................ F15B 21/044; B01D 19/00–19/0495
(Continued)

(56) References Cited

U.S. PATENT DOCUMENTS 3,830,041 A * 8/1974 Huppke ................. B01D 47/04
96/177
4,371,318 A * 2/1983 Kime ..................... F04B 11/00
417/304
(Continued)

FOREIGN PATENT DOCUMENTS

JP 2008-202447 A 9/2008
JP 2008-246370 A 10/2008
JP 2009-150315 A 7/2009

OTHER PUBLICATIONS

Japanese International Search Report Dated Aug. 13, 2013.

*Primary Examiner* — T. Bennett McKenzie
(74) *Attorney, Agent, or Firm* — Norris McLaughlin & Marcus PA

(57) ABSTRACT

A main air bubble separation apparatus which uses a swirling flow of oil introduced from a main tank separates the oil into a first oil with air bubbles removed therefrom, and a second oil containing air bubbles; a sub-air bubble separation apparatus is provided in which the second oil is introduced and then separated into a third oil with air bubbles removed therefrom and a fourth oil containing air bubbles; and a sub-tank into which the fourth oil is introduced, and in which the air bubbles contained in the fourth oil are captured and combined with each other so as to be removed from the fourth oil, so that a fifth oil is formed, and is configured such that the first, third and fifth oils are returned to the main tank.

12 Claims, 10 Drawing Sheets

(52) U.S. Cl.
CPC ..... *B01D 19/0057* (2013.01); *B01D 19/0063* (2013.01); *B01D 19/0068* (2013.01); *F15B 1/26* (2013.01)

(58) Field of Classification Search
USPC .................. 96/167, 171, 177–178, 182–186, 96/195–196, 207–216; 95/163, 166, 169, 95/174, 177, 179, 186
See application file for complete search history.

(56) References Cited

U.S. PATENT DOCUMENTS 5,431,816 A * 7/1995 Aldred .................... B01D 35/26
210/416.3
2008/0272064 A1* 11/2008 Leonard .................... C02F 1/78
210/760

* cited by examiner

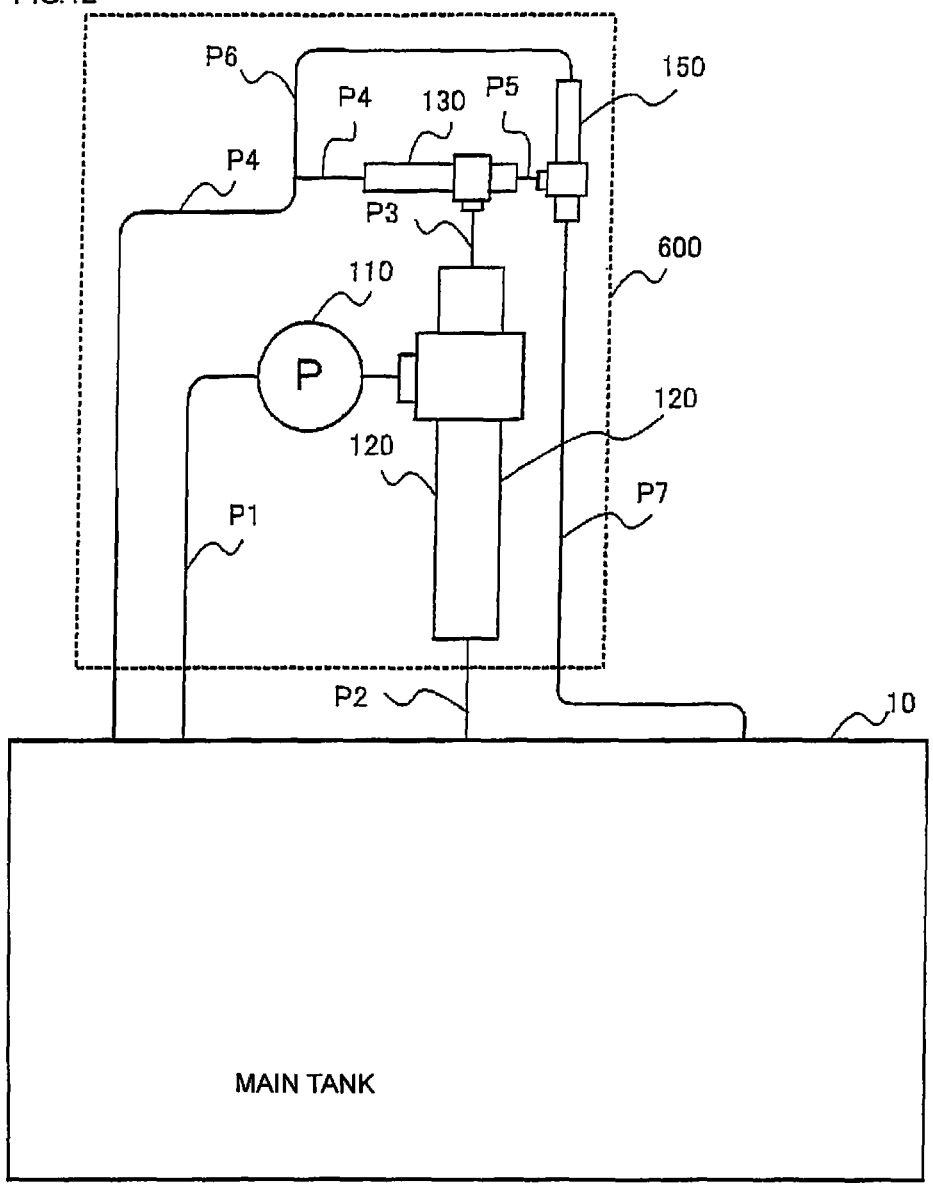

SEPARATION REMOVAL AND CIRCULATION SYSTEM OF AIR BUBBLES IN FLUID

This application is a 371 application of PCT/JP2013/063121 filed Oct. 5, 2013, which claims priority to the Japanese application 2012-237713 Oct. 29, 2012.

TECHNICAL FIELD

The present invention relates to a separation removal and circulation system of air bubbles in fluid, and more particularly, to a separation removal and circulation system of air bubbles in fluid, in which system air bubbles generated in viscous fluid, such as hydraulic fluid in an oil tank of a hydraulic machine, can be effectively removed.

BACKGROUND ART

When air bubbles are generated in hydraulic fluid of a hydraulic machine, and the like, the air bubbles may adversely affect a hydraulic apparatus, a hydraulic system, and the like, which use the hydraulic fluid.
Exhibit A For example, when, in a hydraulic system used for work power transmission in construction machinery, and the like, air bubbles are mixed into the hydraulic fluid which transmits power, the air bubbles cause to reduce the stiffness of the hydraulic fluid and to promote oxidation and degradation of the hydraulic fluid, and also cause to reduce the lubricating properties of the hydraulic fluid and further to reduce the power transmission characteristics and the operating life of the apparatus.

Therefore, an apparatus or a system for effectively removing air bubbles mixed in the hydraulic fluid, and the like, has been demanded. As a conventional air bubble removing system of this kind, a system disclosed in Patent Literature 1 is known.

The air bubble removing system disclosed in Patent Literature 1 is configured by installing an air bubble removing apparatus on the side of a final return passage of a hydraulic circuit for hydraulic drive. Specifically, in a fluid system which performs suction and discharge of fluid in an oscillating tank by using a pump, the influence of the air bubbles entrained in the fluid in the tank is eliminated in such a manner that an air bubble removing apparatus, which converts the flow of the fluid into a swirling flow that causes air bubbles in the fluid to be collected on the axis center of the apparatus so as to be discharged from the apparatus, is incorporated in a return circuit to the tank, and that, after air bubbles in the fluid to be returned to the tank are removed by the air bubble removing apparatus, the fluid is introduced into the suction side of the pump.

CITATION LIST

Patent Literature

Patent Literature 1: Japanese Patent Laid-Open No. 8-318103

SUMMARY OF INVENTION

Technical Problem

However, the air bubble removing apparatus in "the air bubble removing system" described in Patent Literature 1 is strongly influenced by the flow rate of the fluid passing the air bubble removing apparatus, and hence has a problem that air bubbles cannot be effectively removed in the flow rate range which is widely changed according to working conditions.

That is, in "the air bubble removing system" described in Patent Literature 1, the air bubble removing apparatus, in which the fluid introduced therein is separated into a first fluid containing air bubbles that are collected on the axis center of the apparatus by using the swirling flow, and a second fluid with air bubbles removed therefrom, is installed on the side of the final return passage of the hydraulic circuit for hydraulic drive. Therefore, when the flow rate of the fluid introduced into the air bubble removing apparatus is changed according to working conditions, it is difficult to effectively remove the air bubbles.

Further, "the air bubble removing system" described in Patent Literature 1 is configured such that the first fluid separated by the air bubble removing apparatus and containing air bubbles is returned to the upper layer of the fluid in the tank. In this configuration, since, in a state in which the amount of the first fluid is increased, minute air bubbles are also contained in the first fluid, there is a case where, depending on the state of the oscillating tank, the minute bubbles are again mixed into the fluid in the tank so that the original purpose of removing air bubbles also cannot be attained.

Further, many of the air bubbles contained in the first fluid are distributed in the surface layer of the fluid in the tank, which results in a problem that the heat dissipation characteristics, and the like, in the tank are deteriorated.

Therefore, an object of the present invention is to provide a separation removal and circulation system of air bubbles in fluid, which system can effectively and efficiently remove air bubbles generated in the fluid.

Solution to Problem

In order to achieve the above-described object, a separation removal and circulation system of air bubbles in fluid according to a first aspect of the present invention is featured by including: a main tank which stores fluid containing air bubbles to be removed therefrom; a first air bubble separation apparatus into which the fluid containing air bubbles to be removed therefrom is introduced to form a swirling flow of the fluid containing air bubbles to be removed therefrom, so that the fluid containing air bubbles to be removed therefrom is separated into a first fluid with air bubbles removed therefrom and a second fluid containing air bubbles; a second air bubble separation apparatus into which the second fluid separated in the first air bubble separation apparatus is introduced to form a swirling flow of the second fluid, so that the second fluid is separated into a third fluid with air bubbles removed therefrom and a fourth fluid containing air bubbles; and a sub-tank into which the fourth fluid is introduced so that air bubbles contained in the fourth fluid are captured and combined with each other so as to be removed from the fourth fluid, and is featured in that the fluid stored in the main tank and containing air bubbles to be removed therefrom is supplied to the first air bubble separation apparatus via a first pipe, in that the first fluid separated in the first air bubble separation apparatus is returned to the main tank via a second pipe, in that the second fluid separated in the first air bubble separation apparatus is introduced into the second air bubble separation apparatus via a third pipe, in that the third fluid separated in the second air bubble separation apparatus is returned to the main tank via a fourth pipe, in that the fourth fluid separated in the second air bubble separation apparatus is introduced into the sub-tank via a fifth pipe, and in that a fifth fluid with air bubbles removed therefrom in the sub-tank is returned to the main tank via a sixth pipe.

A second aspect of the present invention is featured in that, in the first aspect of the present invention, the first air bubble separation apparatus includes: an inlet port into which the fluid containing air bubbles to be removed therefrom is introduced; swirling flow conversion means in which the flow of the fluid introduced from the inlet port and containing air bubbles to be removed therefrom is converted into a swirling flow; a first fluid chamber whose diameter is gradually reduced toward the downstream side of the swirling flow; a thin pipe whose one end is opened in the first fluid chamber; and a second fluid chamber which is provided on the downstream side of the first fluid chamber, and in that the second fluid chamber is connected to the second pipe, and the other end of the thin pipe is connected to the third pipe.

A third aspect of the present invention is featured in that, in the first aspect of the present invention, the second air bubble separation apparatus includes: an inlet port into which the second fluid is introduced; swirling flow conversion means in which the flow of the second fluid introduced from the inlet port is converted into a swirling flow; a third fluid chamber whose diameter is gradually reduced toward the downstream side of the swirling flow; a thin pipe whose one end is opened in the third fluid chamber; and a fourth fluid chamber which is provided on the downstream side of the third fluid chamber, and in that the fourth fluid chamber is connected to the fourth pipe, and the other end of the thin pipe is connected to the fifth pipe.

A fourth aspect of the present invention is featured in that, in the first aspect of the present invention, the sub-tank is arranged above the main tank.

A fifth aspect of the present invention is featured in that, in the first aspect of the present invention, the sub-tank is arranged in the main tank.

A sixth aspect of the present invention is featured in that, in the first aspect of the present invention, the main tank includes a floating suction filter which follows the vertical movement of the fluid surface of the fluid stored in the main tank and containing air bubbles to be removed therefrom, and which extracts the fluid containing air bubbles to be removed therefrom.

A seventh aspect of the present invention is featured by including: a main tank which stores fluid containing air bubbles to be removed therefrom; a main air bubble separation apparatus into which the fluid containing air bubbles to be removed therefrom is introduced to form a swirling flow of the fluid containing air bubbles to be removed therefrom, so that the fluid is separated into a fluid with air bubbles removed therefrom and a fluid containing air bubbles; one or more sub-air bubble separation apparatuses, each of which is provided at a subsequent stage of the main air bubble separation apparatus and forms a swirling flow of the fluid containing air bubbles, so that the fluid is separated into a fluid with air bubbles removed therefrom and a fluid containing air bubbles; and a sub-tank into which the fluid separated in the sub-air bubble separation apparatus and containing air bubbles is introduced so that the air bubbles contained in the fluid are captured and combined with each other so as to be removed from the fluid.

An eighth aspect of the present invention is featured by including: a main tank which stores fluid containing air bubbles to be removed therefrom; a first air bubble separation apparatus into which the fluid containing air bubbles to be removed therefrom is introduced to form a swirling flow of the fluid containing air bubbles to be removed therefrom, so that the fluid containing air bubbles to be removed therefrom is separated into a first fluid with air bubbles removed therefrom and a second fluid containing air bubbles; and a second air bubble separation apparatus into which the second fluid separated in the first air bubble separation apparatus is introduced to form a swirling flow of the second fluid, so that the second fluid is separated into a third fluid with air bubbles removed therefrom and a fourth fluid containing air bubbles, and is featured in that the fluid stored in the main tank and containing air bubbles to be removed therefrom is supplied to the first air bubble separation apparatus via a first pipe, in that the first fluid separated in the first air bubble separation apparatus is returned to the main tank via a second pipe, in that the second fluid separated in the first air bubble separation apparatus is introduced into the second air bubble separation apparatus via a third pipe, in that the third fluid separated in the second air bubble separation apparatus is returned to the main tank via a fourth pipe, and in that the fourth fluid separated in the second air bubble separation apparatus is returned to the main tank via a fifth pipe.

A ninth aspect of the present invention is featured in that, in the eighth aspect of the present invention, the first air bubble separation apparatus includes: an inlet port into which the fluid containing air bubbles to be removed therefrom is introduced; swirling flow conversion means in which the flow of the fluid introduced from the inlet port and containing air bubbles to be removed therefrom is converted into a swirling flow; a first fluid chamber whose diameter is gradually reduced toward the downstream side of the swirling flow; a thin pipe whose one end is opened in the first fluid chamber; and a second fluid chamber which is provided on the downstream side of the first fluid chamber, and in that the second fluid chamber is connected to the second pipe, and the other end of the thin pipe is connected to the third pipe.

A tenth aspect of the present invention is featured in that, in the eighth aspect of the present invention, the second air bubble separation apparatus includes: an inlet port into which the second fluid is introduced; swirling flow conversion means in which the flow of the second fluid introduced from the inlet port is converted into a swirling flow; a third fluid chamber whose diameter is gradually reduced toward the downstream side of the swirling flow; a thin pipe whose one end is opened in the third fluid chamber; and a fourth fluid chamber which is provided on the downstream side of the third fluid chamber, and in that the fourth fluid chamber is connected to the fourth pipe, and the other end of the thin pipe is connected to the fifth pipe.

An eleventh aspect of the present invention is featured in that, in the eighth aspect of the present invention, the main tank includes a floating suction filter which follows the vertical movement of the fluid surface of the fluid stored in the main tank and containing air bubbles to be removed therefrom, and which extracts the fluid containing air bubbles to be removed therefrom.

A twelfth aspect of the present invention is featured by including: a main tank which stores fluid containing air bubbles to be removed therefrom; a main air bubble separation apparatus into which the fluid containing air bubbles to be removed therefrom is introduced to form a swirling flow of the fluid containing air bubbles to be removed therefrom, so that the fluid is separated into a fluid with air bubbles removed therefrom and a fluid containing air bubbles; and one or more sub-air bubble separation apparatuses, each of which is provided at a subsequent stage of the main air bubble separation apparatus and forms a swirling flow of the fluid containing air bubbles, so that the fluid is separated into a fluid with air bubbles removed therefrom and a fluid containing air bubbles.

Advantageous Effects of Invention

According to the present invention, the following effects can be obtained.

1) The fluid in the main tank can be always maintained in a state where air bubbles are not contained in the fluid.

2) The arrangement and the flow rate of the circulation system can be set regardless of the original use of the main tank.

3) The capacity of the main tank can be set to a limit capacity corresponding to the original use of the main tank.

4) Air bubbles contained in the fluid stored in the main tank can be removed effectively and efficiently, and hence the service life extension and resource saving can be realized in the system.

BRIEF DESCRIPTION OF DRAWINGS

FIG. 12 is a view showing a system configuration of Embodiment 5 of the separation removal and circulation system of air bubbles in fluid according to the present invention.

DESCRIPTION OF EMBODIMENTS

In the following, an embodiment of a separation removal and circulation system of air bubbles in fluid according to the present invention will be described in detail with reference to the accompanying drawings.

Embodiment 1

Figure 1:
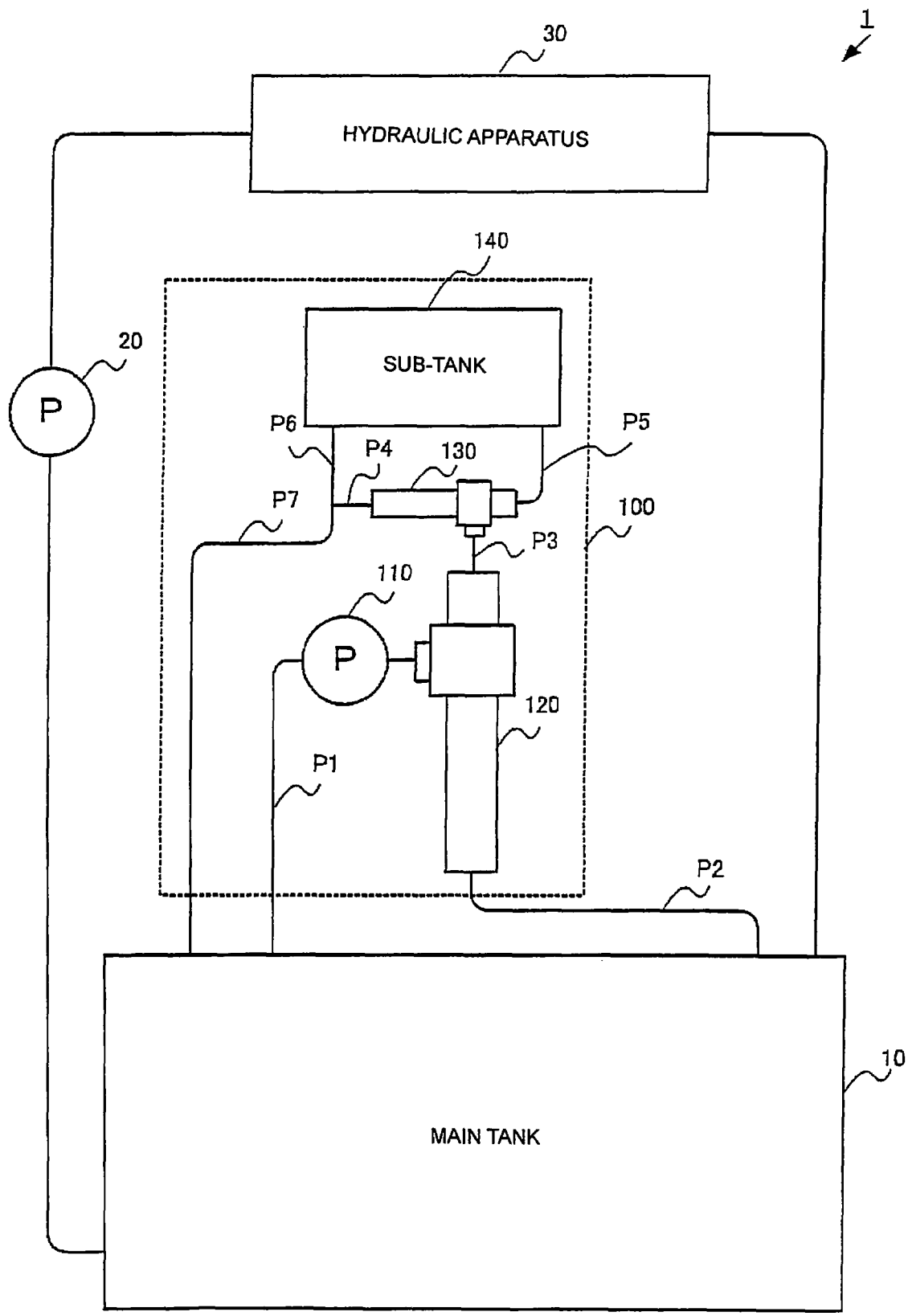
FIG. 1 is a view showing a hydraulic system to which a separation removal and circulation system of air bubbles in fluid of Embodiment 1 according to the present invention is applied.

FIG. 1 is a view showing a hydraulic system to which a separation removal and circulation system of air bubbles in fluid of Embodiment 1 according to the present invention is applied.

In a hydraulic system 1 shown in FIG. 1, an oil circulation passage, in which oil stored in a main tank 10 is supplied to a hydraulic apparatus 30 by a pump 20, and in which the oil used as hydraulic fluid in the hydraulic apparatus 30 is again returned to the main tank 10, is configured as a main oil circulation passage.

In the hydraulic system 1, there is a case in which air bubbles are mixed into the oil used as hydraulic fluid in the hydraulic apparatus 30 due to various causes, such as a temperature rise, of the hydraulic fluid in the hydraulic apparatus 30, and in which the air bubbles are returned to the main tank 10 as they are.

As a result, the amount of air bubbles is increased in the oil of the main tank 10. This causes problems that the stiffness of the hydraulic fluid supplied from the main tank 10 to the hydraulic apparatus 30 is reduced, that the oxidation and degradation of the hydraulic fluid is promoted, that the lubricating properties of the hydraulic fluid are reduced, and that the power transmission characteristics and the operating life of the apparatus are reduced.

To cope with these problems, the hydraulic system 1 of Embodiment 1 is configured such that an air bubble separation removal and circulation passage according to the present invention is provided independently of the main oil circulation passage, and such that the air bubbles mixed into the oil in the main tank 10 are effectively and efficiently removed by the air bubble separation removal and circulation passage.

In a separation removal and circulation system 100 of air bubbles in fluid in Embodiment 1 according to the present invention applied to the hydraulic system 1 shown in FIG. 1, the oil stored in the main tank 10 is pressure-fed to a main air bubble separation apparatus 120 via a pipe P1 by using a pump 110 which is provided independently of the pump 20 provided in the main oil circulation passage.

In the main air bubble separation apparatus 120, the oil, which is supplied via the pipe P1 and which contains air bubbles to be removed therefrom, is separated into a first fluid (oil) with air bubbles removed therefrom, and a second fluid (oil) containing air bubbles. The details of the main air bubble separation apparatus 120 will be described below in detail with reference to FIG. 2.

The first oil, from which air bubbles are removed in the main air bubble separation apparatus 120, is returned to the main tank 10 via a pipe P2, and the second oil containing air bubbles is supplied to a sub-air bubble separation apparatus 130 via a pipe P3.

In the sub-air bubble separation apparatus 130, the oil, which is supplied via the pipe P3 and which contains air bubbles, is separated into a third fluid (oil) with air bubbles removed therefrom, and a fourth fluid (oil) containing air bubbles. The details of the sub-air bubble separation apparatus 130 will be described below in detail with reference to FIG. 3.

The third oil, from which air bubbles are removed in the sub-air bubble separation apparatus 130, is returned to the main tank 10 via pipes P4 and P7, and the fourth oil containing air bubbles is supplied to a sub-tank 140 via a pipe P5.

In the sub-tank 140, the details of which will be described below in detail with reference to FIG. 4, air bubbles contained in the fourth oil are captured and combined with each other to become large in size so as to be removed from the fourth oil and discharged from the sub-tank 140, as a result of which a fifth fluid (oil) with air bubbles removed therefrom is formed.

The fifth oil, from which air bubbles are removed in the sub-tank 140, is returned to the main tank 10 via pipes P6 and P7.

Figure 2:
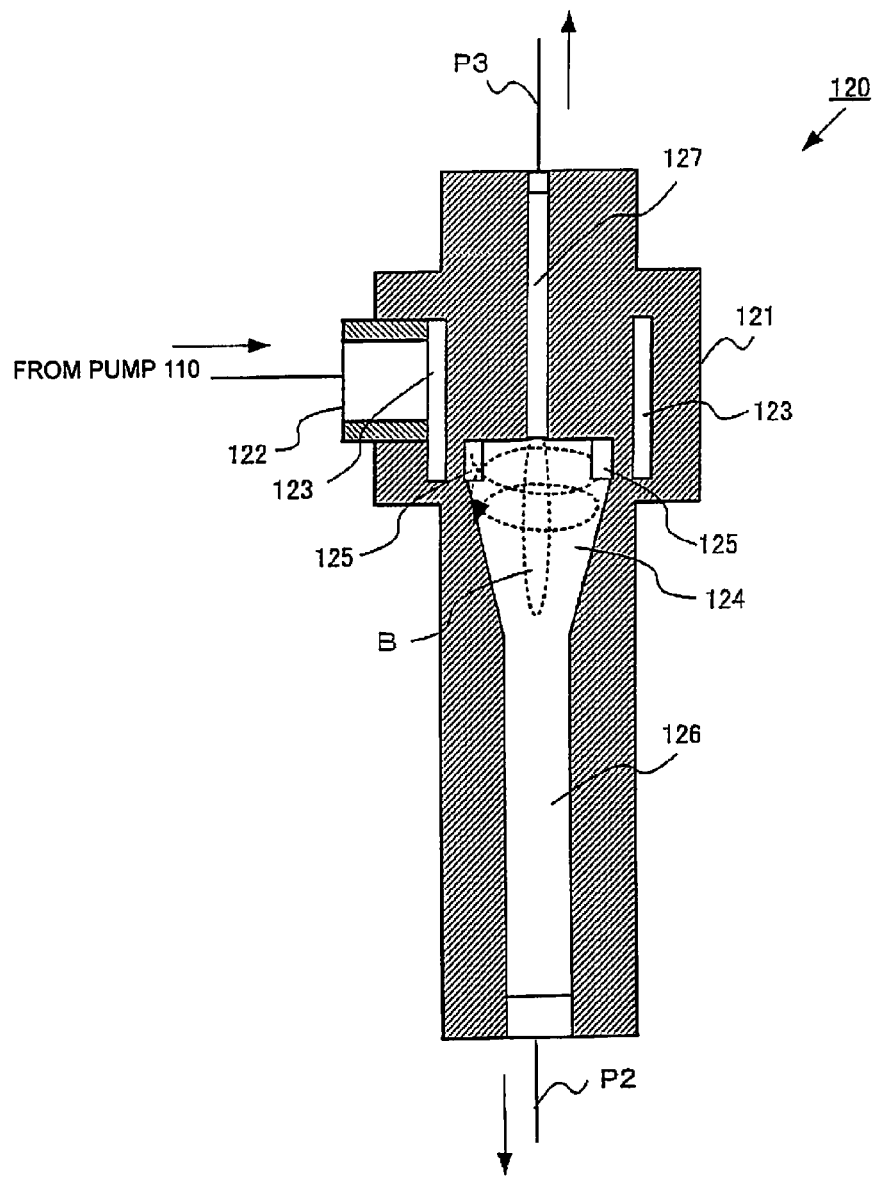
FIG. 2 is a cross-sectional view showing an example of a main air bubble separation apparatus used in the separation removal and circulation system of air bubbles in fluid shown in FIG. 1.

FIG. 2 is a cross-sectional view showing an example of the main air bubble separation apparatus 120 used in the separation removal and circulation system 100 of air bubbles in fluid, which system is applied to the hydraulic system 1 shown in FIG. 1.

The main air bubble separation apparatus 120 is configured such that oil introduced into the main air bubble separation apparatus 120 and containing air bubbles to be removed therefrom is separated, by using a swirling flow, into a first oil with air bubbles removed therefrom and a second oil containing air bubbles. A cylindrical swirling flow forming section 121 is provided substantially at the center portion of the main air bubble separation apparatus 120.

An inlet port 122, into which oil containing air bubbles to be removed therefrom is introduced from the main tank 10, is provided at the swirling flow forming section 121 perpendicularly to the central axis of the swirling flow forming section 121, and is connected to an annular flow passage 123 formed along the peripheral edge of the swirling flow forming section 121. A discharge port 125, from which the oil flowing through the annular flow passage 123 is discharged into a first fluid chamber 124 in the swirling-flow tangential direction, is provided at the annular flow passage 123.

The first fluid chamber 124 is formed to have a conical trapezoidal shape whose diameter is gradually reduced toward the downstream side of the swirling flow of the oil flowing through the first fluid chamber 124. A second fluid chamber 126 is connected to the downstream side of the first fluid chamber 124, and the downstream side of the second fluid chamber 126 is connected to the pipe P2.

Further, at the first fluid chamber 124, a thin pipe 127, the distal end of which is opened in the first fluid chamber 124, is provided along the central axis of the main air bubble separation apparatus 120. The pipe P3 is connected to the other end of the thin pipe 127.

In the main air bubble separation apparatus 120 configured as described above, when oil containing air bubbles to be removed therefrom is pressurized by the pump 110, so as to be introduced from the main tank 10 into the inlet port 122 of the air bubble separation apparatus 120, the oil is made to flow through the annular flow passage 123 and to flow out from the discharge port 125, and thereby a swirling flow of the oil is formed in the first fluid chamber 124.

Here, since the first fluid chamber 124 is formed to have the conical trapezoidal shape whose diameter is gradually reduced toward the downstream side, the centrifugal force generated by the swirling flow causes the oil containing no air bubble to be collected on the side of the peripheral wall of the first fluid chamber 124, and causes the air bubbles to be collected near the center of the first fluid chamber 124 as shown by B in FIG. 2.

By the back pressure applied in the first fluid chamber 124, the air bubbles collected on the center side of the first fluid chamber 124 are made to flow out, as the second oil, into the pipe P3 through the thin pipe 127 together with a part of the oil in the first fluid chamber 124, so as to be led to the sub-air bubble separation apparatus 130.

Further, the oil in the first fluid chamber 124, from which oil the air bubbles are removed by the thin pipe 127, is made to flow out, as the first oil, into the pipe P2 via the second fluid chamber 126, so as to be returned to the main tank 10.

Figure 3:
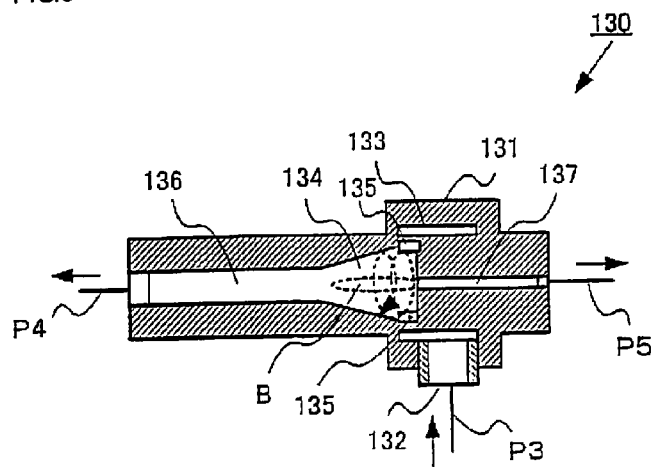
FIG. 3 is a cross-sectional view showing an example of a sub-air bubble separation apparatus used in the separation removal and circulation system of air bubbles in fluid shown in FIG. 1.

FIG. 3 is a cross-sectional view showing an example of the sub-air bubble separation apparatus 130 used in the separation removal and circulation system 100 of air bubbles in fluid, which system is applied to the hydraulic system 1 shown in FIG. 1.

The sub-air bubble separation apparatus 130 shown in FIG. 3 has the same basic configuration as that of the main air bubble separation apparatus 120 shown in FIG. 2, but is configured to have a capacity (size) of about one-fifth to one-tenth of the capacity (size) of the main air bubble separation apparatus 120 shown in FIG. 2.

That is, the sub-air bubble separation apparatus 130 shown in FIG. 3 is configured such that, similarly to the main air bubble separation apparatus 120 shown in FIG. 2, the introduced oil, which contains air bubbles to be removed therefrom, is separated, by using a swirling flow, into a third oil with air bubbles removed therefrom and a fourth oil containing air bubbles. A cylindrical swirling flow forming section 131 is provided substantially at the center portion of the sub-air bubble separation apparatus 130. An inlet port 132, into which the second oil is introduced from the main air bubble separation apparatus 120, is provided at the swirling flow forming section 131 perpendicularly to the central axis of the swirling flow forming section 131, and is connected to an annular flow passage 133 formed along the peripheral edge of the swirling flow forming section 131. A discharge port 135, from which the oil flowing through the annular flow passage 133 is discharged into a first fluid chamber 134 in the swirling-flow tangential direction, is provided at the annular flow passage 133.

The first fluid chamber 134 is formed to have a conical trapezoidal shape whose diameter is gradually reduced toward the downstream side of the swirling flow of the oil flowing through the first fluid chamber 134. A second fluid chamber 136 is connected to the downstream side of the first fluid chamber 134, and the downstream side of the second fluid chamber 136 is connected to the pipe P4.

Further, at the first fluid chamber 134, a thin pipe 137, the distal end of which is opened in the first fluid chamber 134, is provided along the central axis of the sub-air bubble separation apparatus 130, and the pipe P5 is connected to the other end of the thin pipe 137.

Also in the sub-air bubble separation apparatus 130 configured as described above, when the second oil containing air bubbles is introduced from the main air bubble separation apparatus 120 into the inlet port 132, the oil is made to flow through the annular flow passage 133 and to flow out from the discharge port 135, and thereby a swirling flow of the oil is formed in the first fluid chamber 134. By the centrifugal force generated by the swirling flow, the oil containing no air bubble is collected on the side of the peripheral wall of the first fluid chamber 134, and air bubbles are collected near the center of the first fluid chamber 134 as shown by B in FIG. 3. By the back pressure applied in the first fluid chamber 134, the air bubbles collected on the center side of the first fluid chamber 134 is made to flow out, as the fourth oil, into the pipe P5 through the thin pipe 137 together with a part of the oil in the first fluid chamber 134. The fourth oil made to flow out into the pipe P5 is led to the sub-tank 140.

Further, the oil in the first fluid chamber 134, from which oil air bubbles are removed by the thin pipe 137, is made to flow out, as the third oil, into the pipe P4 via the second fluid chamber 136. The third oil made to flow out into the pipe P4 is returned to the main tank 10 via the pipe P7.

Figure 4:
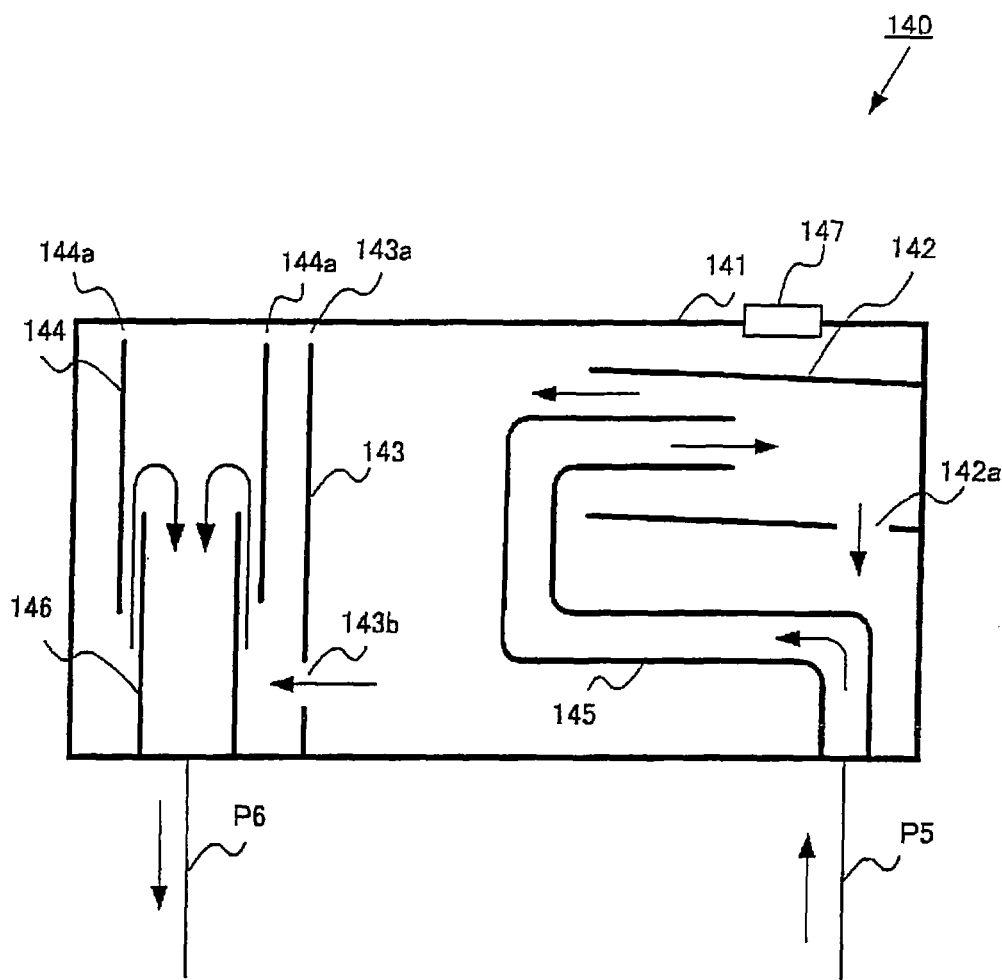
FIG. 4 is a cross-sectional view showing an example of a sub-tank used in the separation removal and circulation system of air bubbles in fluid shown in FIG. 1.

FIG. 4 is a cross-sectional view showing an example of the sub-tank 140 used in the separation removal and circulation system 100 of air bubbles in fluid shown in FIG. 1.

Air bubbles in the sub-tank 140 are removed by a plurality of partition plates provided in the sub-tank 140, and preferably by a plurality of filters. The fourth oil introduced into the sub-tank 140 via the pipe P5 is made to successively flow through a plurality of fluid chambers defined by a plurality of partition plates in the sub-tank 140 and further passes through a plurality of filters respectively provided in the fluid chambers. Thereby, air bubbles contained in the fourth oil are captured and combined with each other, so as to become large in size. As a result, the air bubbles contained in the fourth oil are separated from the fourth oil and discharged from the sub-tank 140, so that the fifth fluid (oil) with air bubbles removed therefrom is formed.

FIG. 4 is a cross-sectional view showing a configuration example of the sub-tank 140 of the hydraulic system 100 shown in FIG. 1. Note that FIG. 4 is illustrated by omitting the plurality of filters respectively provided in the fluid chambers.

The sub-tank 140 shown in FIG. 4 is configured by including: a housing 141; a cylindrical partition 142, one end of which is implanted into the right side surface of the housing 141 so that the other end is inclined obliquely upward, and in which a hole 142a is provided at a lower portion thereof and the other end thereof is opened; a partition plate 143 which is provided substantially at the center of the housing 141 so as to partition the inside of the housing 141 into two right and left portions, and which is configured such that a gap 143a for moving air bubbles is formed between the partition plate 143 and the upper surface of the housing 141, and such that a through hole 143b is also formed at a lower portion of the partition plate 143; a cylindrical partition 144 which is implanted into the upper surface of the left housing 141 of the housing 141 partitioned by the partition plate 143 so as to be directed downward, and which is configured such that a gap 144a for moving air bubbles is formed at an upper portion of the cylindrical partition 144, and such that the other end of the cylindrical partition 144 is opened; an oil inlet pipe 145, a part of which is inserted into the opening section of the cylindrical partition 142, and the other end of which is connected to the pipe P5 from below; and an oil outlet pipe 146, a part of which is inserted into the opening section of the cylindrical partition 144, and the other end of which is connected to the pipe P6. Further, a breather 147, which is an air vent mechanism for the sub-tank, is provided in the upper surface of the housing 141.

In the sub-tank 140 configured as described above, the fourth oil, which contains air bubbles and which is made to flow out from the sub-air bubble separation apparatus 130 into the pipe P5, is led into the cylindrical partition 142 implanted in the right side surface of the housing 141 via the oil inlet pipe 145. In the cylindrical partition 142, a part of air bubbles of the fourth oil are separated to move upward from the opening section of the cylindrical partition 142.

Further, a part of the fourth oil is made to move toward the partition plate 143 through the opening section of the cylindrical partition 142 or through the hole 142a provided at the lower portion of the cylindrical partition 142. The fourth oil made to move toward the partition plate 143 is made to pass through the gap formed between the inner surface of the cylindrical partition 144, and the outer surface of the oil outlet pipe 146, and to flow into the oil outlet pipe 146 from the opening section of the upper portion of the oil outlet pipe 146.

In this process, the air bubbles contained in the fourth oil are combined with each other to become large in size, so as to be collected in the upper portion of the sub-tank 140 and discharged from the breather 147. As a result, in the sub-tank 140, the fifth oil with air bubbles separated and removed therefrom is formed, so as to flow into the oil outlet pipe 146. The fifth oil, which is introduced into the oil outlet pipe 146, and from which the air bubbles are removed, is returned to the main tank 10 via the pipes P6 and P7.

Figure 5:
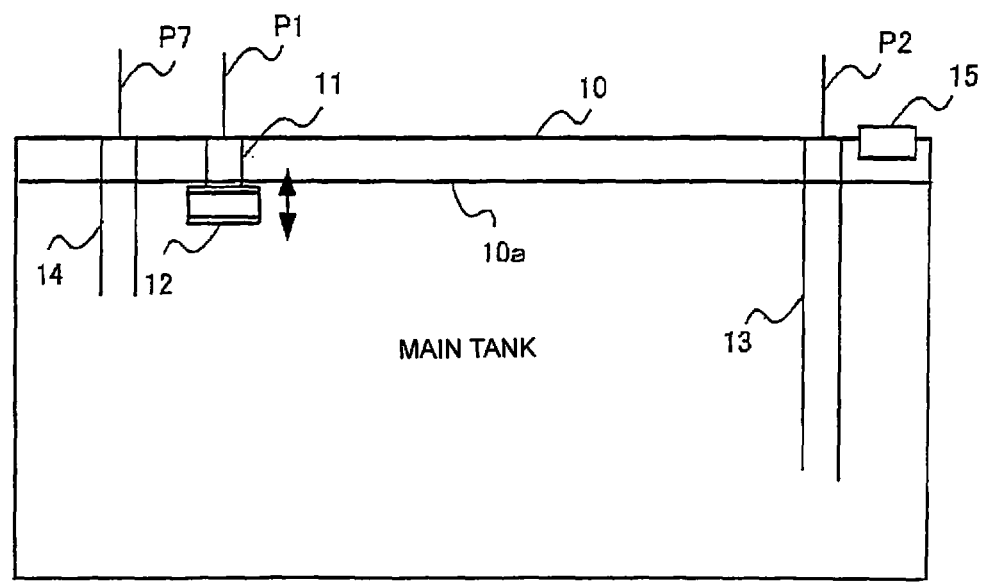
FIG. 5 is a view for explaining an operation of a floating suction filter arranged in a main tank used in the separation removal and circulation system of air bubbles in fluid shown in FIG. 1.

FIG. 5 is a view for explaining an operation of a floating suction filter arranged in the main tank used in the separation removal and circulation system of air bubbles in fluid shown in FIG. 1.

In the separation removal and circulation system 100 of air bubbles in fluid in Embodiment 1 as described above, the fluid stored in the main tank 10 and containing air bubbles to be removed (oil containing air bubbles to be removed) therefrom is pressurized by the pump 110 via the pipe P1, so as to be pressure-fed to the main air bubble separation apparatus 120. Further, a breather 15, which is an air vent mechanism for the main tank, is provided in the upper surface of the main tank 10.

Here, from the viewpoint of improving the efficiency of removing air bubbles, it is preferred that the oil, which contains air bubbles to be removed therefrom and which is taken out from the main tank 10 via the pipe P1, is an oil containing a large amount of air bubbles near the oil surface of the main tank 10.

For this reason, the separation removal and circulation system 100 of Embodiment 1 is configured such that, in the main tank 10, a floating suction filter 12, which follows the vertical movement of the oil surface in the main tank 10, is provided at the distal end of a pipe 11 which is connected to the pipe P1 to extract the fluid containing air bubbles to be removed therefrom, and such that the fluid containing air bubbles to be removed therefrom is extracted from a portion of the fluid near the oil surface in the main tank 10 via the floating suction filter 12. Note that a pipe 13 is a first return pipe connected to the pipe P2, and a pipe 14 is a second return pipe connected to the pipe P7.

Embodiment 2

Figure 6:
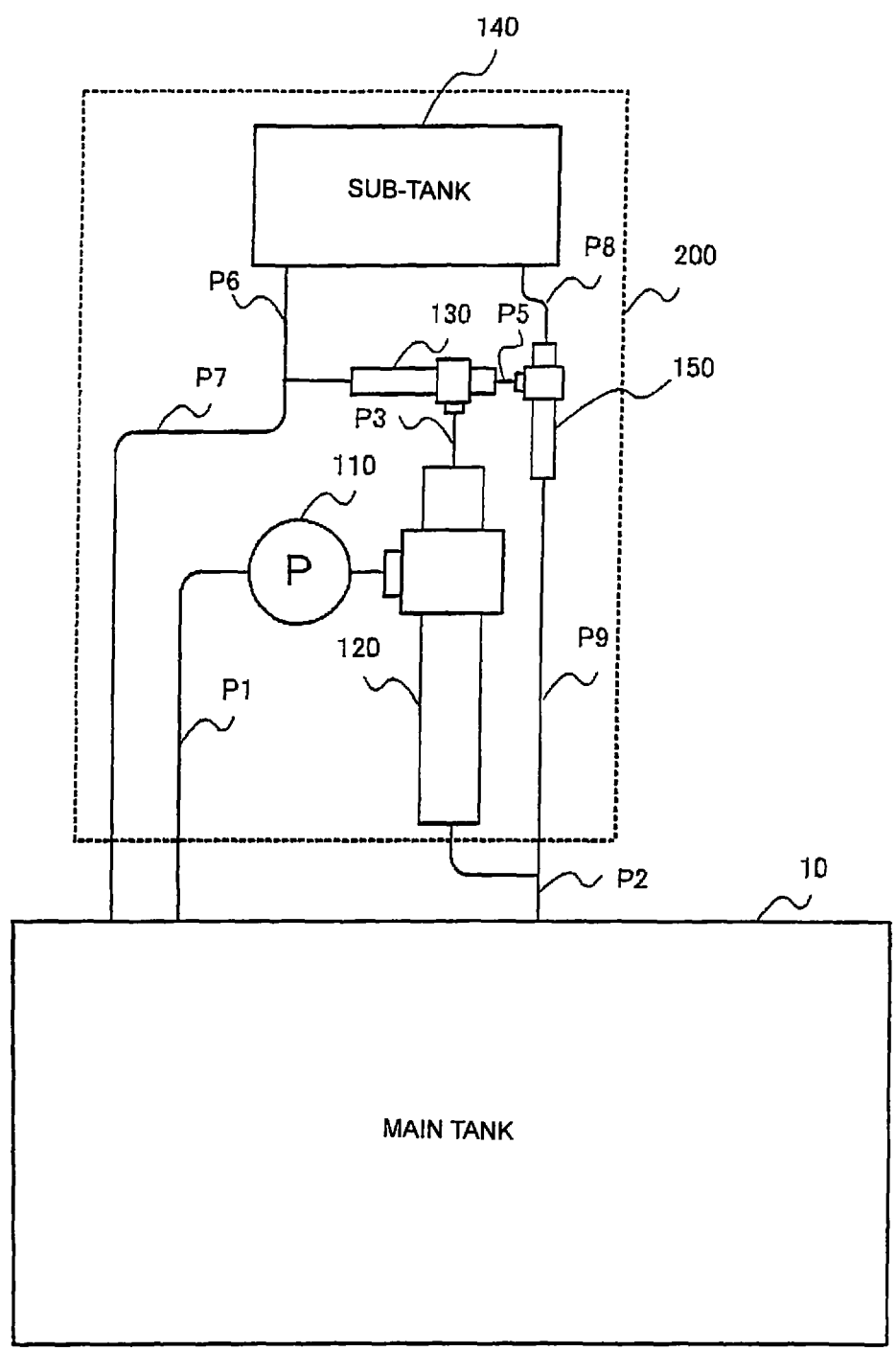
FIG. 6 is a view showing a system configuration of Embodiment 2 of the separation removal and circulation system of air bubbles in fluid according to the present invention.

FIG. 6 is a view showing a system configuration of Embodiment 2 of the separation removal and circulation system of air bubbles in fluid according to the present invention.

Note that, in the examples described below, the oil circulation passage is illustrated by omitting the main oil circulation passage in which the oil stored in the main tank 10 is supplied to the hydraulic apparatus 30 by the pump 20, and in which the oil used, as hydraulic fluid, in the hydraulic apparatus 30 is again returned to the main tank 10. Further, in the examples described below, portions having the same functions as those of the separation removal and circulation system 100 of air bubbles in fluid shown in FIG. 1 are denoted by the same reference numerals and characters as those in FIG. 1, and the detailed description thereof is omitted.

A separation removal and circulation system 200 of air bubbles in fluid in Embodiment 2 shown in FIG. 6 is configured such that a sub-air bubble separation apparatus 150 is provided at the subsequent stage of the sub-air bubble separation apparatus 130 of the separation removal and circulation system 100 of air bubbles in fluid shown in FIG. 1.

That is, the separation removal and circulation system 100 of air bubbles in fluid shown in FIG. 1 is configured such that the fourth oil separated in the sub-air bubble separation apparatus 130 and containing air bubbles is lead to the sub-tank 140 via the pipe P5. However, the separation removal and circulation system 200 of air bubbles in fluid in Embodiment 2 shown in FIG. 6 is configured such that the fourth oil separated in the sub-air bubble separation apparatus 130 and containing air bubbles is led to the sub-air bubble separation apparatus 150 in which the fourth oil is separated into a fifth fluid (oil) with air bubbles removed therefrom, and a sixth fluid (oil) containing air bubbles, and such that the fifth oil with air bubbles removed therefrom is returned to the main tank 10 via a pipe P9, and the sixth oil containing air bubbles is led to the sub-tank 140 via a pipe P8.

In the above-described configuration, it is possible to use, as the sub-air bubble separation apparatus 150, an apparatus which has the same configuration as the configuration of the sub-air bubble separation apparatus 130 shown in FIG. 3, and which has a capacity (size) equal to or smaller than the capacity (size) of the sub-air bubble separation apparatus 130 shown in FIG. 3.

Note that a case is described in which, in the separation removal and circulation system 200 of air bubbles in fluid in Embodiment 2 shown in FIG. 6, the sub-air bubble separation apparatus is configured in two stages by using the sub-air bubble separation apparatus 130 and the sub-air bubble separation apparatus 150, but the sub-air bubble separation apparatus may be configured in three or more stages.

Embodiment 3

Figure 7:
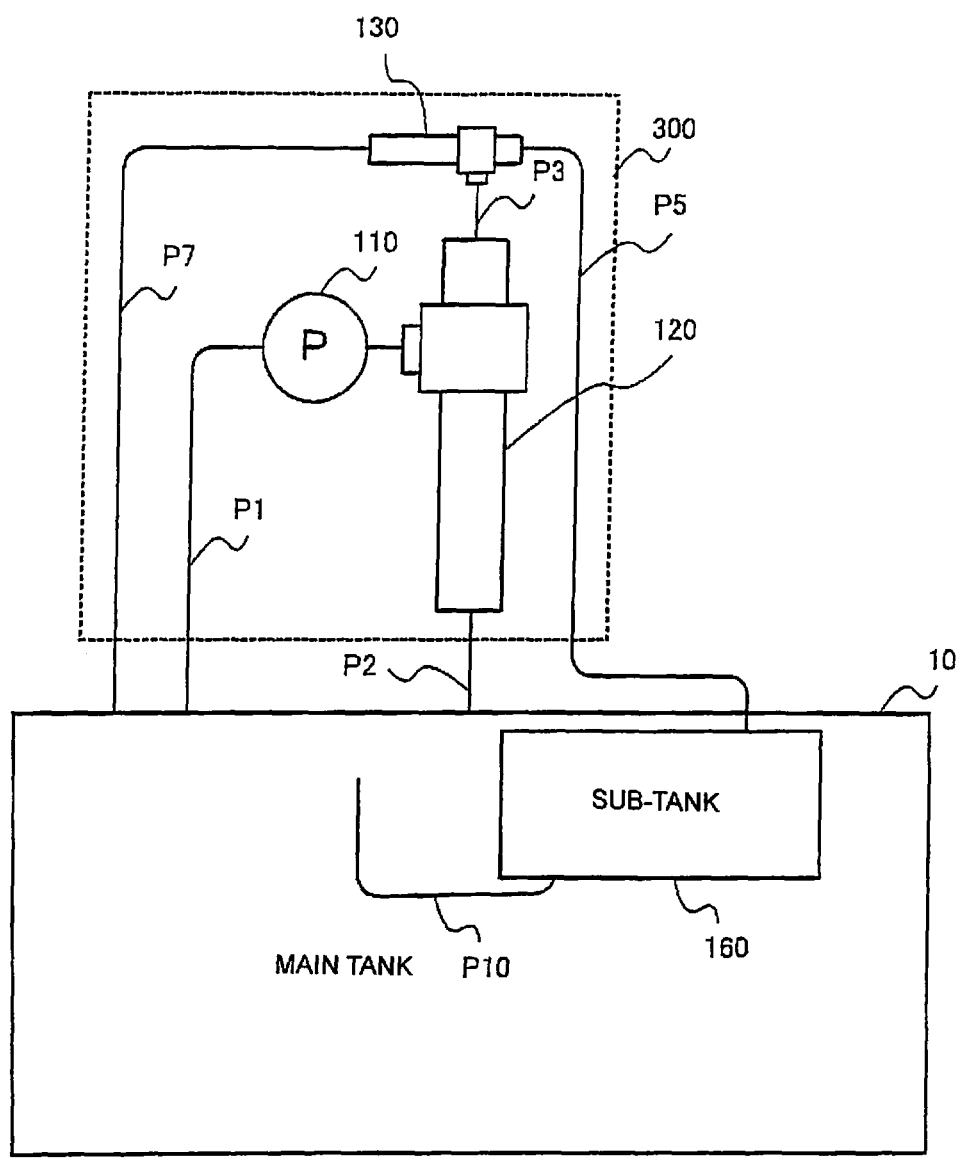
FIG. 7 is a view showing a system configuration of Embodiment 3 of the separation removal and circulation system of air bubbles in fluid according to the present invention.

FIG. 7 is a view showing a system configuration of Embodiment 3 of the separation removal and circulation system of air bubbles in fluid according to the present invention.

A separation removal and circulation system 300 of air bubbles in fluid in Embodiment 3 shown in FIG. 7 is configured such that the sub-tank 140 of the separation removal and circulation system 100 of air bubbles in fluid shown in FIG. 1 is provided in the main tank 10.

That is, the separation removal and circulation system 300 of air bubbles in fluid in Embodiment 3 shown in FIG. 7 is configured such that a sub-tank 160 is provided in the main tank 10, such that the third oil, from which air bubbles are removed in the sub-air bubble separation apparatus 130, is returned to the main tank 10 via the pipe P7, and such that the fourth oil containing air bubbles is led to the sub-tank 160 provided in the main tank 10 via the pipe P5. The other configuration of the separation removal and circulation system 300 of air bubbles in fluid shown in FIG. 7 is the same as the configuration of the separation removal and circulation system 100 of air bubbles in fluid shown in FIG. 1 except for the configuration of the sub-tank 160.

Figure 8:
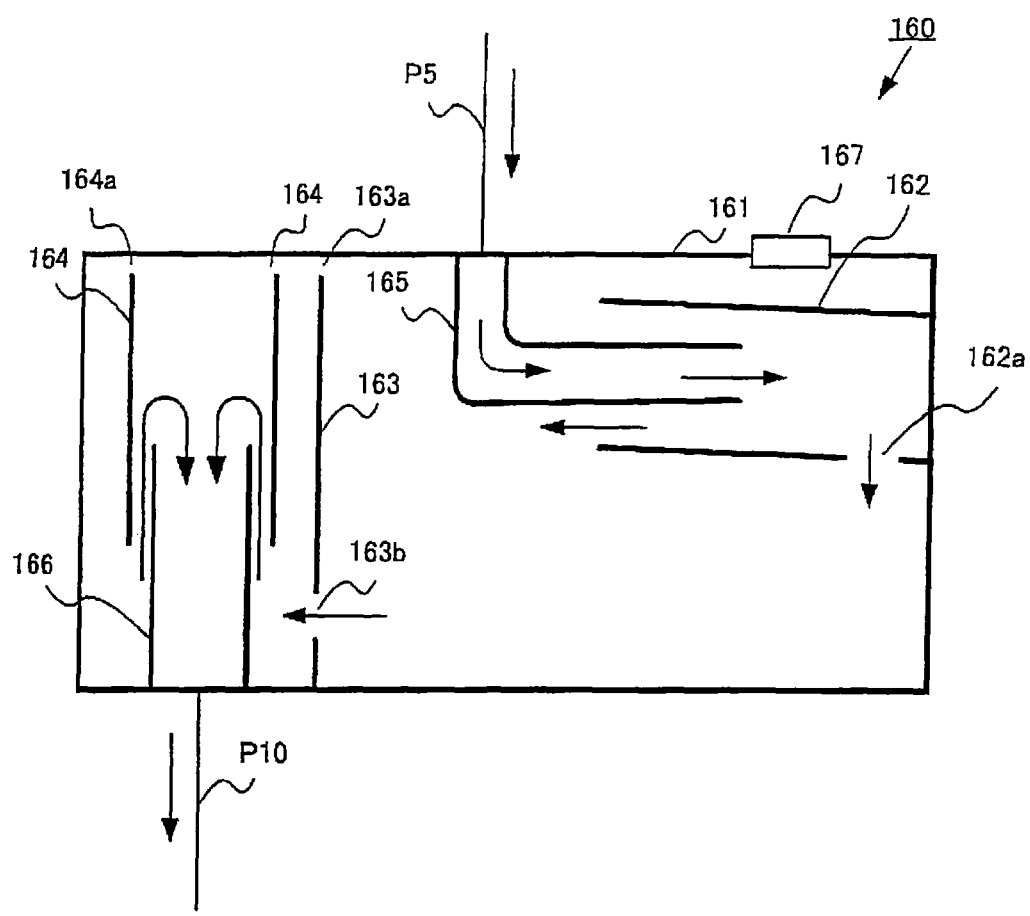
FIG. 8 is a cross-sectional view showing an example of a sub-tank used in the separation removal and circulation system of air bubbles in fluid shown in FIG. 7.

FIG. 8 is a cross-sectional view showing an example of the sub-tank 160 used in the separation removal and circulation system of air bubbles in fluid shown in FIG. 7.

Similarly to the sub-tank 140 shown in FIG. 4, the sub-tank 160 shown in FIG. 8 is configured by including: a housing 161; a cylindrical partition 162, one end of which is implanted into the right side surface of the housing 161 so that the other end is inclined obliquely upward, and in which a hole 162a is provided at a lower portion thereof and the other end thereof is opened; a partition plate 163 which is provided substantially at the center of the housing 161 so as to partition the inside of the housing 161 into two right and left portions, and which is configured such that a gap 163a for moving air bubbles is formed between the partition plate 163 and the upper surface of the housing 161, and such that a through hole 163b is also formed at a lower portion of the partition plate 163; a cylindrical partition 164 which is implanted into the upper surface of the left housing 161 of the housing 161 partitioned by the partition plate 163 so as to be directed downward, and which is configured such that a gap 164a for moving air bubbles is formed at an upper portion of the cylindrical partition 164, and such that the other end of the cylindrical partition 164 is opened; an oil inlet pipe 165, a part of which is inserted into the opening section of the cylindrical partition 162, and the other end of which is connected to the pipe P5 from above; and an oil outlet pipe 166, a part of which is inserted into the opening section of the cylindrical partition 164, and the other end of which is connected to a pipe P10. Further, a breather 167, which is an air vent mechanism for the sub-tank, is provided in the upper surface of the housing 161.

In the sub-tank 160 configured as described above, the fourth oil, which is made to flow out from the sub-air bubble separation apparatus 130 into the pipe P5, and which contains air bubbles, is led into the cylindrical partition 162 implanted in the right side surface of the housing 161 via the oil inlet pipe 165. In the cylindrical partition 162, a part of air bubbles of the fourth oil are separated so as to move upward from the opening section of the cylindrical partition 162.

Further, a part of the fourth oil is made to move toward the partition plate 163 through the opening section of the cylindrical partition 162 or through the hole 162a provided at the lower portion of the cylindrical partition 162. The fourth oil made to move toward the partition plate 163 is made to pass through the gap formed between the inner surface of the cylindrical partition 164 and the outer surface of the oil outlet pipe 166, and to flow into the oil outlet pipe 166 from the opening section of the upper portion of the oil outlet pipe 166.

In this process, the air bubbles contained in the fourth oil are combined with each other to become large in size, so as to be collected in the upper portion of the sub-tank 160 and discharged from the breather 167. As a result, in the sub-tank 160, the fifth oil with air bubbles separated and removed therefrom is formed so as to flow into the oil outlet pipe 166. The fifth oil, which is introduced into the oil outlet pipe 166, and from which the air bubbles are removed, is returned to the main tank 10 via the pipe P10.

Embodiment 4

Figure 9:
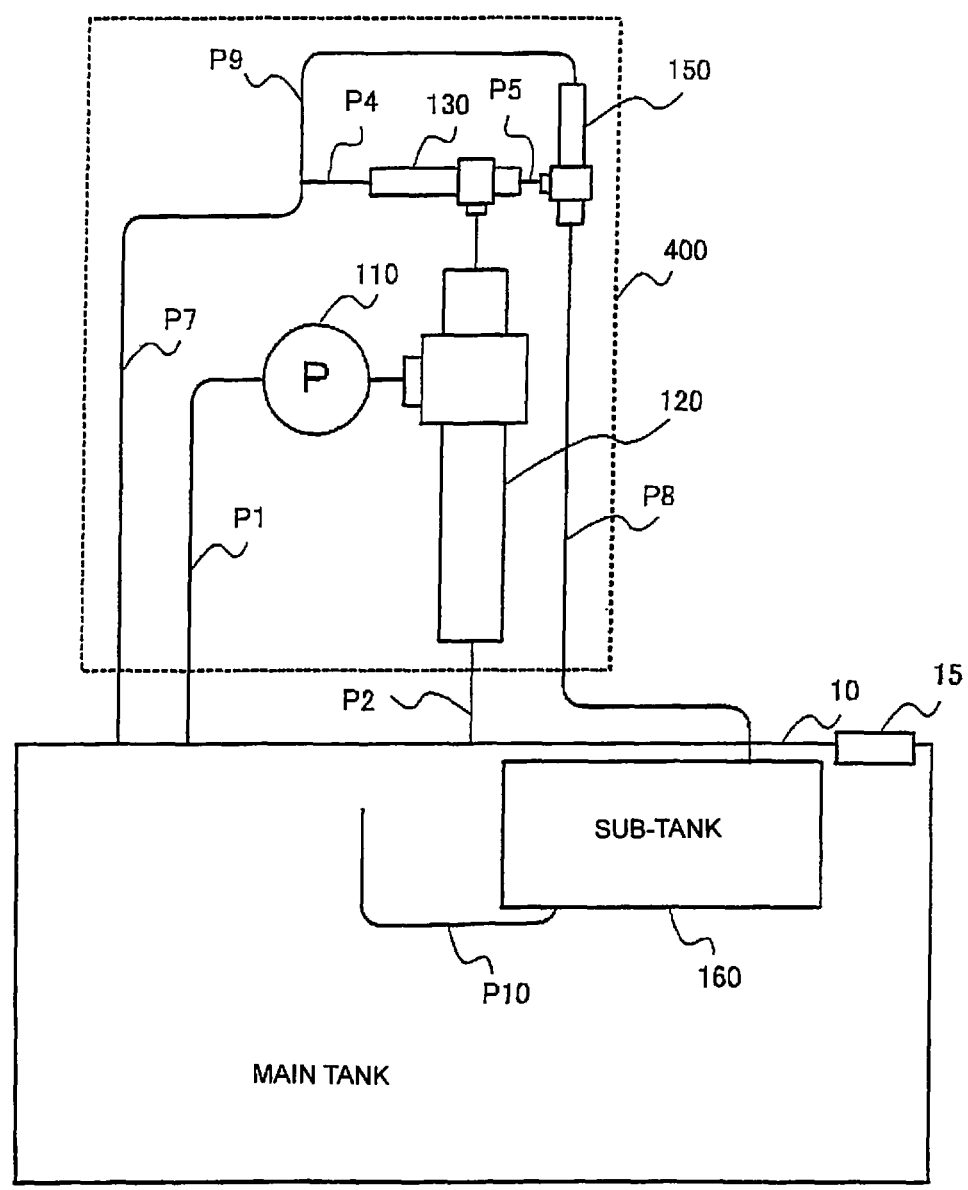
FIG. 9 is a view showing a system configuration of Embodiment 4 of the separation removal and circulation system of air bubbles in fluid according to the present invention.

FIG. 9 is a view showing a system configuration of Embodiment 4 of the separation removal and circulation system of air bubbles in fluid according to the present invention.

A separation removal and circulation system 400 of air bubbles in fluid in Embodiment 4 shown in FIG. 9 is configured such that the sub-air bubble separation apparatus 150 is provided at the subsequent stage of the sub-air bubble separation apparatus 130 of the separation removal and circulation system 300 of air bubbles in fluid shown in FIG. 7.

That is, the separation removal and circulation system 300 of air bubbles in fluid shown in FIG. 9 is configured such that the fourth oil separated in the sub-air bubble separation apparatus 130 and containing air bubbles is lead to the sub-tank 160 in the main tank 10 via the pipe P5. However, the separation removal and circulation system 400 of air bubbles in fluid in Embodiment 4 shown in FIG. 9 is configured such that the fourth oil separated in the sub-air bubble separation apparatus 130 and containing air bubbles is led to the sub-air bubble separation apparatus 150 in which the fourth oil is separated into a fifth oil with air bubbles removed therefrom, and a sixth oil containing air bubbles, and such that the fifth oil with air bubbles removed therefrom is returned to the main tank 10 via the pipe P9, and the sixth oil containing air bubbles is led to the sub-tank 160 via the pipe P8. Further, the breather 15, which is an air vent mechanism for the main tank, is provided in the upper surface of the main tank 10.

In the above-described configuration, it is possible to use, as the sub-air bubble separation apparatus 150, an apparatus which has the same configuration as the configuration of the sub-air bubble separation apparatus 130 shown in FIG. 3, and which has a capacity (size) equal to or smaller than the capacity (size) of the sub-air bubble separation apparatus 130 shown in FIG. 3.

Note that a case is described in which, in the separation removal and circulation system 400 of air bubbles in fluid in Embodiment 4 shown in FIG. 9, the sub-air bubble separation apparatus is configured in two stages by using the sub-air bubble separation apparatus 130 and the sub-air bubble separation apparatus 150, but the sub-air bubble separation apparatus may be configured in three or more stages.

Figure 10:
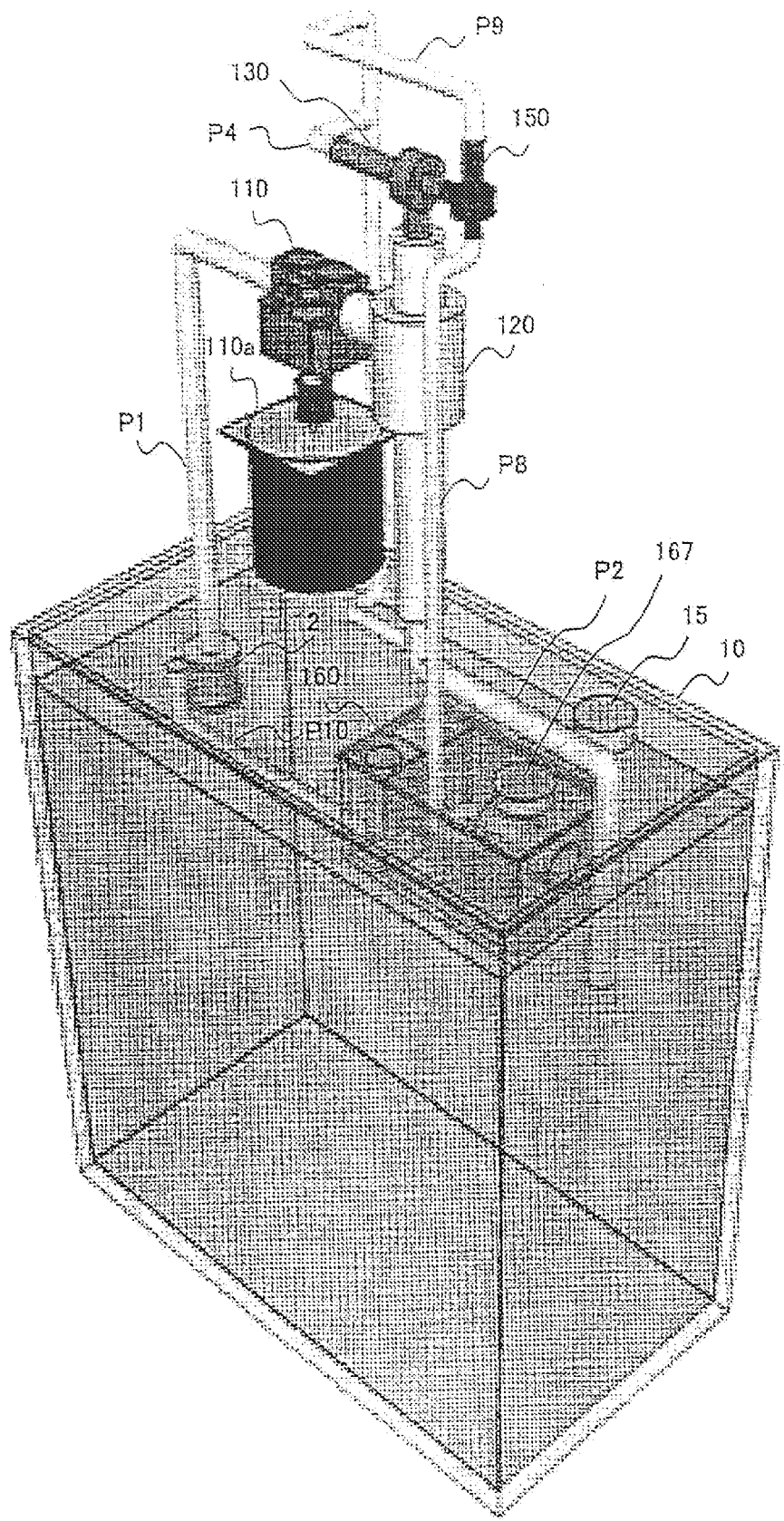
FIG. 10 is a perspective view of the separation removal and circulation system of air bubbles in fluid shown in FIG. 9.

FIG. 10 is a perspective view of the separation removal and circulation system of air bubbles in fluid shown in FIG. 9.

In FIG. 10, a motor 110a is used for driving the pump 110, the breather 15 is an air vent mechanism for the main tank, which is provided in the main tank 10, and the breather 167 is an air vent mechanism for the sub-tank, which is provided in the sub-tank 160.

Embodiment 5

Figure 11:
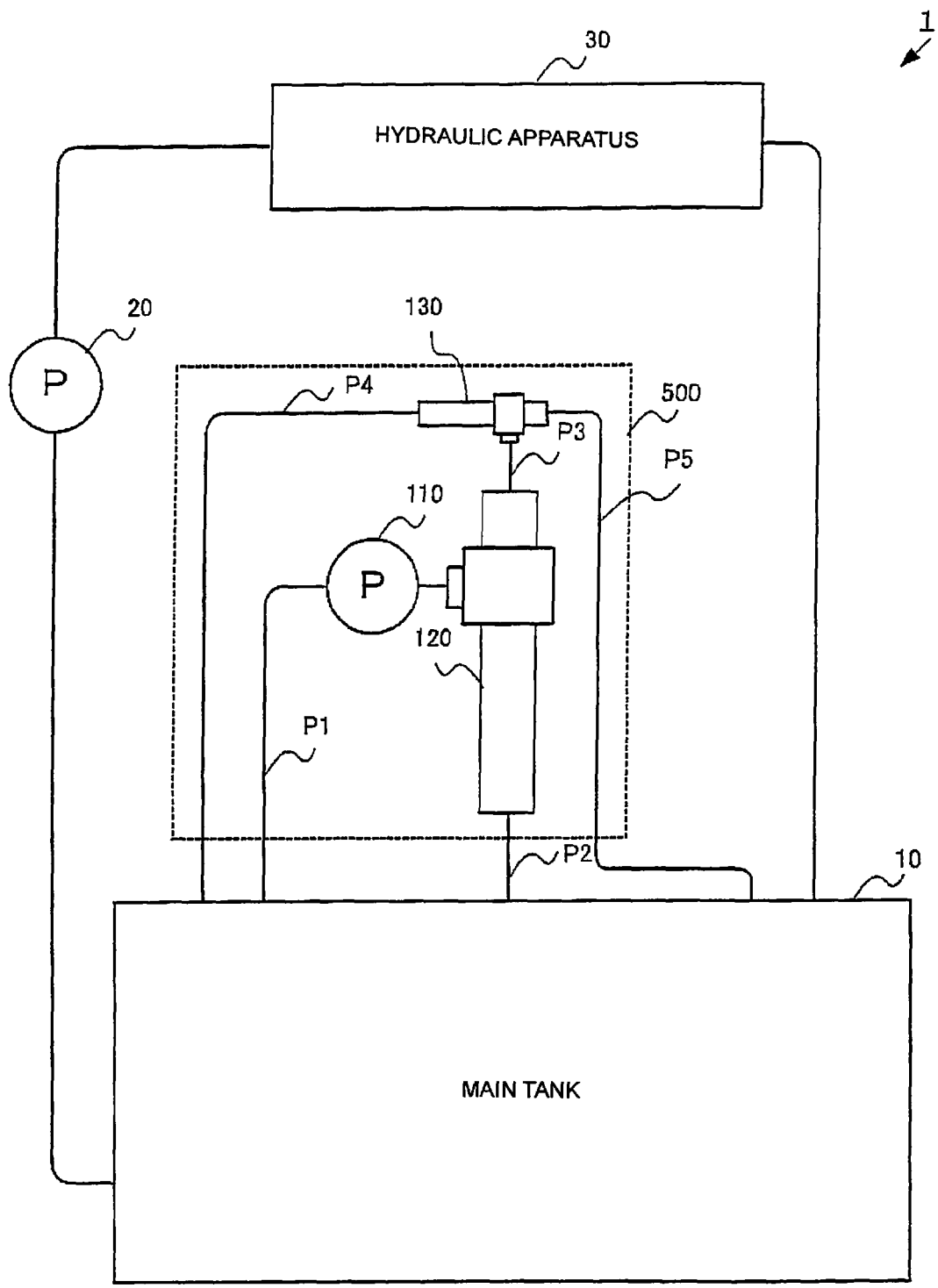
FIG. 11 is a view showing a system configuration of Embodiment 5 of the separation removal and circulation system of air bubbles in fluid according to the present invention.

FIG. 11 is a view showing a system configuration of Embodiment 5 of the separation removal and circulation system of air bubbles in fluid according to the present invention. Also, a hydraulic system 2 of Embodiment 5 is configured such that an air bubble separation removal and circulation passage according to the present invention is provided independently of the main oil circulation passage, and such that the air bubbles mixed into oil in the main tank 10 are effectively and efficiently removed by the air bubble separation removal and circulation passage.

Note that, also in examples described below, portions having the same functions as those of the separation removal and circulation system 100 of air bubbles in fluid shown in FIG. 1 are denoted by the same reference numerals and characters as those in FIG. 1, and the detailed description thereof is omitted.

In a separation removal and circulation system 500 of air bubbles in fluid in Embodiment 5 according to the present invention applied to the hydraulic system 2 shown in FIG. 11, the oil stored in the main tank 10 is pressure-fed to the main air bubble separation apparatus 120 via the pipe P1 by using the pump 110 which is provided independently of the pump 20 provided in the main oil circulation passage.

In the main air bubble separation apparatus 120, the oil supplied via the pipe P1 and containing air bubbles to be removed therefrom is separated into a first fluid (oil) with air bubbles removed therefrom, and a second fluid (oil) containing air bubbles. The details of the main air bubble separation apparatus 120 are the same as those shown in FIG. 2.

The first oil, from which air bubbles are removed in the main air bubble separation apparatus 120, is returned to the main tank 10 via the pipe P2, and the second oil containing air bubbles is supplied to the sub-air bubble separation apparatus 130 via the pipe P3.

In the sub-air bubble separation apparatus 130, the oil supplied via the pipe P3 and containing air bubbles is separated into a third fluid (oil) with air bubbles removed therefrom, and a fourth fluid (oil) containing air bubbles. The details of the sub-air bubble separation apparatus 130 are the same as those shown in FIG. 3.

The third oil, from which air bubbles are removed in the sub-air bubble separation apparatus 130, is returned to the main tank 10 via the pipe P4. Note that the fourth oil separated in the sub-air bubble separation apparatus 130 and containing air bubbles is returned to the main tank 10 via the pipe P5.

Note that the details of the main tank 10 are the same as those shown in FIG. 5.

Embodiment 6

FIG. 12 is a view showing a system configuration of Embodiment 6 of the separation removal and circulation system of air bubbles in fluid according to the present invention.

Note that, in Embodiment 6 shown in FIG. 12, the oil circulation passage is illustrated by omitting the main oil circulation passage in which the oil stored in the main tank 10 shown in FIG. 11 is supplied to the hydraulic apparatus 30 by the pump 20, and in which the oil used as hydraulic fluid in the hydraulic apparatus 30 is again returned to the main tank 10.

A separation removal and circulation system 600 of air bubbles in fluid of the hydraulic system 2 in Embodiment 2 shown in FIG. 12 is configured such that the sub-air bubble separation apparatus 150 is provided at the subsequent stage of the sub-air bubble separation apparatus 130 shown in FIG. 11.

That is, the separation removal and circulation system 500 of air bubbles in fluid shown in FIG. 11 is configured such that the fourth oil separated in the sub-air bubble separation apparatus 130 and containing air bubbles is returned to the main tank 10 via the pipe P5. However, the separation removal and circulation system 600 of air bubbles in fluid in Embodiment 6 shown in FIG. 12 is configured such that the fourth oil separated in the sub-air bubble separation apparatus 130 and containing air bubbles is led to the sub-air bubble separation apparatus 150 in which the fourth oil is separated into a fifth fluid (oil) with air bubbles removed therefrom, and a sixth fluid (oil) containing air bubbles.

The fifth oil separated in the sub-air bubble separation apparatus 150, from which air bubbles are removed, is returned to the main tank 10 via the pipes P6 and P4. Further, the sixth oil separated in the sub-air bubble separation apparatus 150 and containing air bubbles is returned to the main tank 10 via the pipe P7.

In the above-described configuration, it is possible to use, as the sub-air bubble separation apparatus 150, an apparatus which has a configuration the same as the configuration of the sub-air bubble separation apparatus 130 shown in FIG. 3, and which has a capacity (size) equal to or smaller than the capacity (size) of the sub-air bubble separation apparatus 130 shown in FIG. 3.

Note that a case is described in which, in the separation removal and circulation system 600 of air bubbles in fluid in Embodiment 6 shown in FIG. 12, the sub-air bubble separation apparatus is configured in two stages by using the sub-air bubble separation apparatus 130 and the sub-air bubble separation apparatus 150, but the sub-air bubble separation apparatus may be configured in three or more stages.

In the above, examples of a typical embodiment of the present invention are described. However, the present invention is not limited to the examples described above and the examples shown in the accompanying drawings, and can be practiced with appropriate modifications without departing from the scope of the present invention.

For example, the above-described examples show the case where the separation removal and circulation system of air bubbles in fluid according to the present invention is applied to a hydraulic system, but the present invention is also applicable to other various apparatuses and systems in which air bubbles contained in fluid need to be removed.

REFERENCE SIGNS LIST

10 Main tank
20 Pump
30 Hydraulic apparatus
100, 200, 300, 400, 500, 600 Separation removal and circulation system of air bubbles in fluid
110 Pump
120 Main air bubble separation apparatus
121, 131 Swirling flow forming section
122, 132 Inlet port
123, 133 Annular flow passage
124, 134 First fluid chamber
125, 135 Discharge port
126, 136 Second fluid chamber
127, 137 Thin pipe
130, 150 Sub-air bubble separation apparatus
140, 160 Sub-tank

The invention claimed is:

1. A separation removal and circulation system of air bubbles in fluid comprising:
(1) a main tank which stores fluid containing air bubbles to be removed therefrom;
(2) a first air bubble separation apparatus operatively connected to the main tank such that the fluid stored in the main tank and containing air bubbles to be removed therefrom can be introduced into said first air bubble separation apparatus for separation into a first fluid with air bubbles removed therefrom and a second fluid containing air bubbles, so that air bubbles is separated and removed from the fluid containing air bubbles to be removed therefrom;
(3) a second air bubble separation apparatus operatively connected to the first air bubble separation apparatus such that the second fluid separated from the first air bubble separation apparatus can be introduced into said second air bubble separation apparatus for separation into a third fluid with air bubbles removed therefrom and a fourth fluid containing air bubbles, so that air bubbles is separated and removed from the second fluid; and
(4) a sub-tank operatively connected to the second air bubble separation apparatus such that the fourth fluid separated from the second air bubble separation apparatus can be introduced into the sub-tank, said sub-tank being configured so that air bubbles contained in the fourth fluid are captured and combined with each other so as to be removed from the fourth fluid,
wherein the first air bubble separation apparatus comprises:
(2)(a) a first fluid chamber having a hollow conical trapezoidal shape whose diameter is reduced toward a downstream side of the first fluid chamber;
(2)(b) a discharge port provided on an upstream side of the first fluid chamber, positioned so that the flow of the fluid containing air bubbles to be removed therefrom is introduced into the first fluid chamber via said discharge port, and is discharged along an inner wall tangential direction of the first fluid chamber to form a swirling flow of the fluid containing air bubbles to be removed therefrom in the first fluid chamber;
(2)(c) a first pipe having a distal end which projects into the first fluid chamber, and configured to suck the second fluid containing air bubbles of the fluid containing bubbles to be removed therefrom gathered in a vicinity of the first fluid chamber by the swirling flow, on a central axis of the first fluid chamber; and
(2)(d) a cylindrical second fluid chamber connected to the downstream side of the first fluid chamber, and configured to discharge the first fluid with air bubbles removed therefrom by the first pipe,
and wherein the second air bubble separation apparatus comprises:
(3)(a) a third fluid chamber having a hollow conical trapezoidal shape whose diameter is reduced toward a downstream side of the third fluid chamber;
(3)(b) a discharge port provided on an upstream side of the third fluid chamber, positioned so that the flow of the second fluid is introduced into the third fluid chamber via said discharge port, and is discharged along an inner wall tangential direction of the third fluid chamber to form a swirling flow of the second fluid in the third fluid chamber;
(3)(c) a second pipe having a distal end which projects into the second fluid chamber, and configured to suck the fourth fluid containing air bubbles of the second fluid gathered in a vicinity of the first fluid chamber by the swirling flow, on a central axis of the third fluid chamber; and
(3)(d) a cylindrical fourth fluid chamber connected to the downstream side of the third fluid chamber, and configured to discharge the third fluid with air bubbles removed therefrom by the second pipe,
and further wherein the separation removal and circulation system is configured so that the first fluid with air bubbles removed therefrom in the first air bubble separation apparatus, the third fluid with air bubbles removed therefrom in the second air bubble separation apparatus, and a fluid with air bubbles removed therefrom in the sub-tank can be returned to the main tank.

2. The separation removal and circulation system of air bubbles in fluid according to claim 1, wherein the sub-tank is arranged outside the main tank.

3. The separation removal and circulation system of air bubbles in fluid according to claim 1, wherein the sub-tank is arranged inside the main tank.

4. The separation removal and circulation system of air bubbles in fluid according to claim 1, wherein the main tank comprises a floating suction filter which follows a vertical movement of a fluid surface of the fluid stored in the main tank and containing air bubbles to be removed therefrom, said floating suction filter being configured to extracts the fluid containing air bubbles to be removed therefrom.

5. A separation removal and circulation system of air bubbles in fluid, comprising:
a main tank which stores fluid containing air bubbles to be removed therefrom;
a main air bubble separation apparatus into which the fluid containing air bubbles to be removed therefrom is introduced to separate into a fluid with air bubbles removed therefrom and a fluid containing air bubbles so that air bubbles is separated and removed;
a plurality of sub-air bubble separation apparatuses, each of which is provided at a subsequent stage of the main air bubble separation apparatus and into which the fluid separated from the main air bubble separation apparatus, so that the air bubbles is separated and removed from the fluid containing air bubbles; and
a sub-tank into which the fluid separated from the sub-air bubble separation apparatus is introduced so that air bubbles contained in the fluid are captured and combined with each other so as to be removed from the fluid,
wherein the main bubble separation apparatus comprises:
a first fluid chamber formed to have a hollow conical trapezoidal shape whose diameter is reduced toward the downstream side;
a discharge port provided on the upstream side of the first fluid chamber in which the flow of the fluid introduced and containing air bubbles to be removed therefrom is discharged along the inner wall tangential direction of the first fluid chamber to form a swirling flow of the fluid containing air bubbles to be removed therefrom in the first fluid chamber;
a first pipe whose distal end projects into the first fluid chamber to suck the fluid containing air bubbles of the fluid containing bubbles to be removed therefrom gathered in the vicinity of the first fluid chamber by the swirling flow, on the central axis of the first fluid chamber; and
a cylindrical second fluid chamber connected to the downstream side of the first fluid chamber to discharge the first fluid with air bubbles removed therefrom by the first pipe,
the sub-air bubble separation apparatus comprises:
a third fluid chamber formed to have a hollow conical trapezoidal shape whose diameter is reduced toward the downstream side;
a discharge port provided on the upstream side of the third fluid chamber in which the flow of the fluid containing air bubbles separated from the sub-air bubble separation apparatus introduced is discharged along the inner wall tangential direction of the third fluid chamber to form a swirling flow of the fluid containing air bubbles in the third fluid chamber;
a second pipe whose distal end projects into the second fluid chamber to suck the fluid containing air bubbles gathered in the vicinity of the first fluid chamber by the swirling flow, on the central axis of the third fluid chamber;
a cylindrical fourth fluid chamber connected to the downstream side of the third fluid chamber to discharge the fluid with air bubbles removed therefrom by the second pipe,
the fluid removed air bubbles therefrom in the main air bubble separation apparatus, the fluid removed air bubbles therefrom in the sub-air bubble separation apparatus and the fluid removed air bubbles therefrom in the sub-tank are returned to the main tank.

6. The separation removal and circulation system of air bubbles in fluid according to claim 5, the main tank comprises a floating suction filter which follows the vertical movement of the fluid surface of the fluid stored in the main tank and containing air bubbles to be removed therefrom, and extracts the fluid containing air bubbles to be removed therefrom.

7. The separation removal and circulation system of air bubbles in fluid according to claim 5, wherein the sub-tank is arranged outside the main tank.

8. The separation removal and circulation system of air bubbles in fluid according to claim 5, wherein the sub-tank is arranged inside the main tank.

9. A separation removal and circulation system of air bubbles in fluid, comprising:
a main tank which stores fluid containing air bubbles to be removed therefrom;
a main air bubble separation apparatus into which the fluid containing air bubbles to be removed therefrom is introduced to separate into a fluid with air bubbles removed therefrom and a fluid containing air bubbles so that air bubbles is separated and removed; and
a plurality of sub-air bubble separation apparatus, each of which is provided at a subsequent stage of the main air bubble separation apparatus and into which the fluid separated from the main air bubble separation apparatus, so that the air bubbles is separated and removed from the fluid containing air bubbles,
wherein the main bubble separation apparatus comprises:
a first fluid chamber formed to have a hollow conical trapezoidal shape whose diameter is reduced toward the downstream side;
a discharge port provided on the upstream side of the first fluid chamber in which the flow of the fluid introduced and containing air bubbles to be removed therefrom is discharged along the inner wall tangential direction of the first fluid chamber to form a swirling flow of the fluid containing air bubbles to be removed therefrom in the first fluid chamber;
a first pipe whose distal end projects into the first fluid chamber to suck the second fluid containing air bubbles of the fluid containing bubbles to be removed therefrom gathered in the vicinity of the first fluid chamber by the swirling flow, on the central axis of the first fluid chamber; and
a cylindrical second fluid chamber connected to the downstream side of the first fluid chamber to discharge the first fluid with air bubbles removed therefrom by the first pipe, the sub-air bubble separation apparatus comprises:

a third fluid chamber formed to have a hollow conical trapezoidal shape whose diameter is reduced toward the downstream side;

a discharge port provided on the upstream side of the third fluid chamber in which the flow of the fluid containing air bubbles separated from the sub-air bubble separation apparatus introduced is discharged along the inner wall tangential direction of the third fluid chamber to form a swirling flow of the fluid containing air bubbles in the third fluid chamber;

a second pipe whose distal end projects into the second fluid chamber to suck the fluid containing air bubbles gathered in the vicinity of the first fluid chamber by the swirling flow, on the central axis of the third fluid chamber; and a cylindrical fourth fluid chamber connected to the downstream side of the third fluid chamber to discharge the fluid with air bubbles removed therefrom by the second pipe, the fluid removed air bubbles therefrom in the main air bubble separation apparatus and the fluid removed air bubbles therefrom in the sub-air bubble separation apparatus are returned to the main tank.

10. The separation removal and circulation system of air bubbles in fluid according to claim 9, wherein the main tank comprises a floating suction filter which follows a vertical movement of a fluid surface of the fluid stored in the main tank and containing air bubbles to be removed therefrom and extracts the fluid containing air bubbles to be removed therefrom.

11. A separation removal and circulation system of air bubbles in fluid comprising:

(1) a main tank which stores fluid containing air bubbles to be removed therefrom;

(2) a first air bubble separation apparatus into which the fluid stored in the main tank and containing air bubbles to be removed therefrom is introduced to separate into a first fluid with air bubbles removed therefrom and a second fluid containing air bubbles, so that air bubbles is separated and removed from the fluid containing air bubbles to be removed therefrom; and (3) a second air bubble separation apparatus into which the second fluid separated from the first air bubble separation apparatus is introduced to separate into a third fluid with air bubbles removed therefrom and a fourth fluid containing air bubbles, so that air bubbles is separated and removed from the second fluid, wherein the first air bubble separation apparatus comprises:

(2)(a) a first fluid chamber formed to have a hollow conical trapezoidal shape whose diameter is reduced toward a downstream side of the first fluid chamber;

(2)(b) a discharge port provided on an upstream side of the first fluid chamber in which the flow of the fluid introduced and containing air bubbles to be removed therefrom is discharged along the inner wall tangential direction of the first fluid chamber to form a swirling flow of the fluid containing air bubbles to be removed therefrom in the first fluid chamber;

(2)(c) a first pipe whose distal end projects into the first fluid chamber to suck the second fluid containing air bubbles of the fluid containing bubbles to be removed therefrom gathered in a vicinity of a first fluid chamber by the swirling flow, on a central axis of the first fluid chamber; and (2)(d) a cylindrical second fluid chamber connected to the downstream side of the first fluid chamber to discharge the first fluid with air bubbles removed therefrom by the first tube, the second air bubble separation apparatus comprises:

(3)(a) a third fluid chamber formed to have a hollow conical trapezoidal shape whose diameter is reduced toward a downstream side pf the third fluid chamber;

(3)(b) a discharge port provided on an upstream side of the third fluid chamber in which the flow of the second fluid introduced is discharged along the inner wall tangential direction of the third fluid chamber to form a swirling flow of the second fluid in the third fluid chamber;

(3)(c) a second pipe whose distal end projects into the second fluid chamber to suck the fourth fluid containing air bubbles of the second fluid gathered in a vicinity of the first fluid chamber by the swirling flow, on a central axis of the third fluid chamber; and (3)(d) a cylindrical fourth fluid chamber connected to the downstream side of the third fluid chamber to discharge the third fluid with air bubbles removed therefrom by the second tube, and wherein the first fluid with air bubbles removed therefrom in the first air bubble separation apparatus and the third fluid with air bubbles removed therefrom in the second air bubble separation apparatus are returned to the main tank.

12. The separation removal and circulation system of air bubbles in fluid according to claim 11, wherein the main tank comprises a floating suction filter which follows a vertical movement of a fluid surface of the fluid stored in the main tank and containing air bubbles to be removed therefrom and extracts the fluid containing air bubbles to be removed therefrom.

* * * * *